US009098467B1

(12) United States Patent
Blanksteen et al.

(10) Patent No.: US 9,098,467 B1
(45) Date of Patent: Aug. 4, 2015

(54) ACCEPTING VOICE COMMANDS BASED ON USER IDENTITY

(71) Applicant: Rawles LLC, Wilmington, DE (US)

(72) Inventors: Scott Ian Blanksteen, Issaquah, WA (US); Bjorn Hoffmeister, Seattle, WA (US)

(73) Assignee: Rawles LLC, Wilmington, DE (US)

( * ) Notice: Subject to any disclaimer, the term of this patent is extended or adjusted under 35 U.S.C. 154(b) by 261 days.

(21) Appl. No.: 13/720,841

(22) Filed: Dec. 19, 2012

(51) Int. Cl.
*G10L 15/00* (2013.01)
*G10L 17/00* (2013.01)
*G10L 21/00* (2013.01)
*G10L 25/00* (2013.01)
*G06F 17/20* (2006.01)

(52) U.S. Cl.
CPC ...................................... *G06F 17/20* (2013.01)

(58) Field of Classification Search
CPC ......... G10L 15/22; G10L 15/20; G10L 17/00; G10L 2015/223; G10L 21/0202; G10L 25/78; G10L 15/00; G10L 17/005; G06F 3/167; B60R 16/0373; H04M 1/1271
USPC .................. 704/233, 235, 246, 247, 270, 275
See application file for complete search history.

(56) References Cited

U.S. PATENT DOCUMENTS

| 3,700,815 | A * | 10/1972 | Doddington et al. ......... 704/246 |
| 4,403,114 | A * | 9/1983 | Sakoe ........................... 704/252 |
| 5,970,446 | A * | 10/1999 | Goldberg et al. ............. 704/233 |
| 6,107,935 | A * | 8/2000 | Comerford et al. ......... 340/5.52 |
| 6,529,871 | B1 * | 3/2003 | Kanevsky et al. ............ 704/246 |
| 7,228,275 | B1 * | 6/2007 | Endo et al. .................... 704/235 |
| 7,418,392 | B1 | 8/2008 | Mozer et al. |
| 7,720,683 | B1 | 5/2010 | Vermeulen et al. |
| 7,720,684 | B2 * | 5/2010 | Huerta et al. ................. 704/257 |
| 7,774,204 | B2 | 8/2010 | Mozer et al. |
| 8,065,148 | B2 * | 11/2011 | Huerta et al. ................. 704/257 |
| 8,639,502 | B1 * | 1/2014 | Boucheron et al. ........... 704/226 |
| 8,751,227 | B2 * | 6/2014 | Koshinaka .................... 704/233 |
| 2004/0138882 | A1 * | 7/2004 | Miyazawa .................... 704/233 |
| 2004/0230420 | A1 * | 11/2004 | Kadambe et al. ............. 704/205 |
| 2005/0071157 | A1 * | 3/2005 | Droppo et al. ................ 704/226 |

(Continued)

FOREIGN PATENT DOCUMENTS

WO WO2011088053 7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

*Primary Examiner* — Edgar Guerra-Erazo
(74) *Attorney, Agent, or Firm* — Lee & Hayes, PLLC

(57) ABSTRACT

Techniques for determining when to perform an action associated with a voice command and when to disregard the voice command. In some instances, the techniques reference an identity of a user that utters a command when making this determination. For instance, if a first user awakens a device or initially begins providing voice commands to the device, the device or another computing device may perform actions associated with subsequent voice commands uttered by the same user, while disregarding voice commands from other users. That is, because the device is engaging in a dialog with a first user, the device may refrain from engaging in a dialog with a different user. Additionally or alternatively, the device may begin a new dialog with the different user, either upon identifying the command of the other user or upon finishing the dialog with the first user.

20 Claims, 5 Drawing Sheets

(56) References Cited

U.S. PATENT DOCUMENTS

| | | | |
|---|---|---|---|
| 2006/0041926 A1* | 2/2006 | Istvan et al. | 725/133 |
| 2006/0247913 A1* | 11/2006 | Huerta et al. | 704/1 |
| 2007/0198262 A1* | 8/2007 | Mindlin et al. | 704/246 |
| 2007/0208561 A1* | 9/2007 | Choi et al. | 704/231 |
| 2009/0030698 A1* | 1/2009 | Cerra et al. | 704/275 |
| 2009/0271188 A1* | 10/2009 | Agapi et al. | 704/233 |
| 2010/0179805 A1* | 7/2010 | Huerta et al. | 704/9 |
| 2011/0051907 A1* | 3/2011 | Jaiswal et al. | 379/88.02 |
| 2012/0084312 A1* | 4/2012 | Jenson | 707/767 |
| 2012/0223885 A1 | 9/2012 | Perez | |

\* cited by examiner

ACCEPTING VOICE COMMANDS BASED ON USER IDENTITY

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

When interacting with a device through speech, a device may perform automatic speech recognition (ASR) on audio signals generated from sound captured within an environment for the purpose of identifying voice commands within the signals. However, in instances where multiple people speak within an environment, it can be difficult to determine when user speech is a voice command to which a device should respond, and when user speech should not be interpreted as a voice command to which the device should respond.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
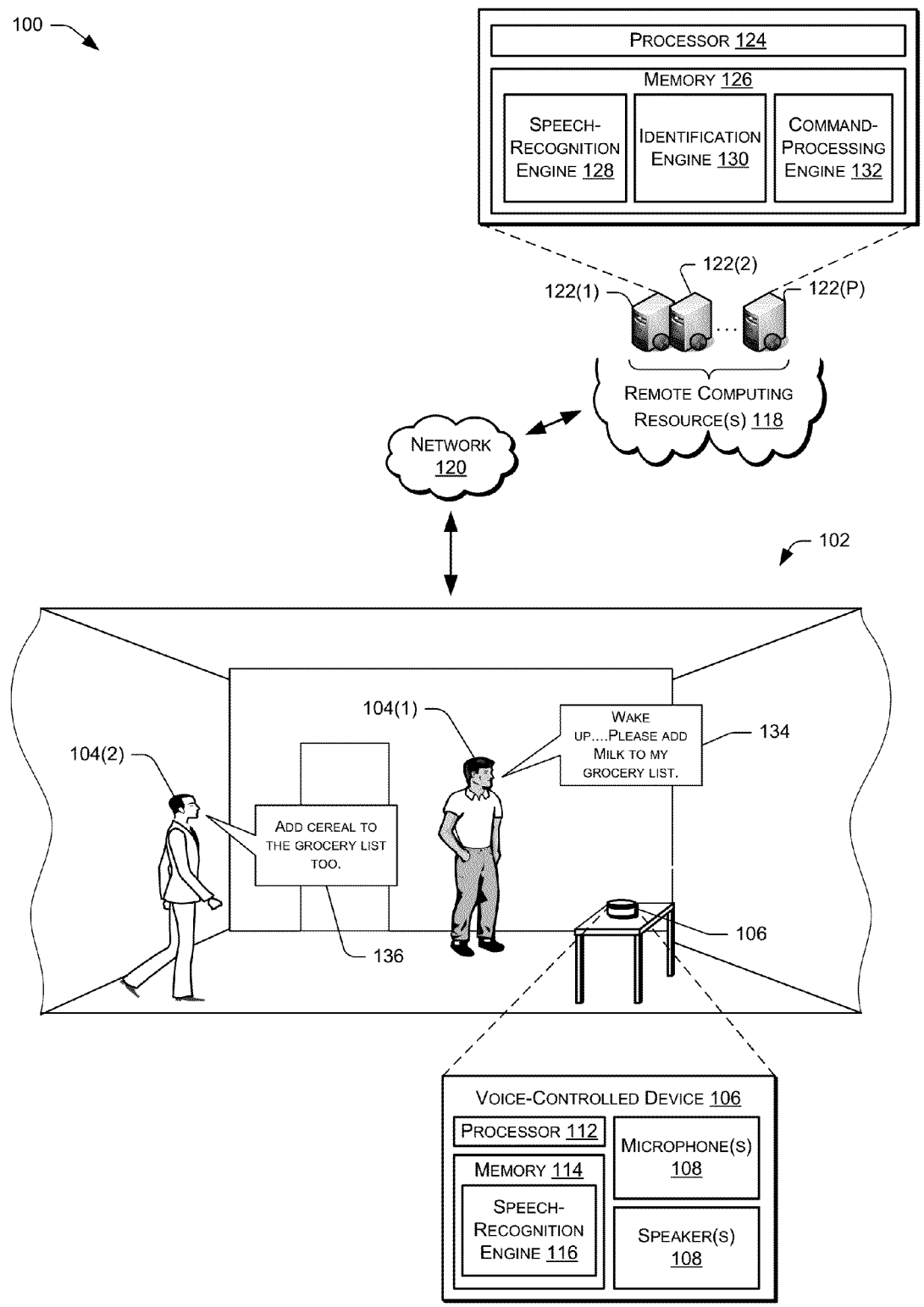
FIG. 1 shows an illustrative voice interaction computing architecture set in a home environment. The architecture includes a voice-controlled device physically situated in the home, along with two users. In this example, a first user wakes up the device for the purpose of providing a voice command to the device. In response, the device performs an action associated with the command, which in this example comprises adding an item to a grocery list of the user. In addition, the device determines that a second user has provided a potential voice command, but the command is disregarded given that it was the first user, rather than the second user, who initially awoke the device.

This disclosure describes, in part, techniques for determining when to perform an action associated with a voice command and when to disregard the voice command. In some instances, the techniques reference an identity of a user that utters a command when making this determination. For instance, if a first user awakens a device or initially begins providing voice commands to the device, the device or another computing device may perform actions associated with subsequent voice commands uttered by the same user, while disregarding voice commands from other users. That is, because the device is engaging in a dialog with a first user, the device may refrain from engaging in a dialog with a different user. Additionally or alternatively, the device may begin a new dialog with the different user, either upon identifying the command of the other user or upon finishing the dialog with the first user.

In some instances described below, a voice-controlled device is configured to operate in at least two different states. In a first state, a microphone unit of the device captures sound from an environment in which the device resides, generates corresponding audio signals, and then locally performs automatic speech recognition (ASR) on the audio signals. The device then compares results of the ASR to a predefined utterance (or "wake word"). The predefined utterance, or wake word, may comprise one or more predefined words. Upon recognition of the predefined utterance, the device transitions from the first state to a second state. Furthermore, in some instances, different users are associated with difference predefined utterances. For instance, a first user may be associated with a first predefined utterance (e.g., "wake up") while a second user may be associated with a second predefined utterance (e.g., "Alabama"). The device may transition from the first to the second state based on detecting either utterance and, further, may use this information to identify the user or may use this information as evidence of a user's identity.

In the second state, the device is configured to provide audio signals generated based on sound captured in the environment to a network-based computing platform. Computing resources of the network-based computing platform then perform ASR on the audio signals to identify a broad array of commands from speech indicated by the audio signals. Upon identifying a command, the computing resources of the platform may provide an instruction and/or content back over the network to the device, which may output audio to the user in response.

In these instances, when a first user utters a predefined utterance, the voice-controlled device may begin providing audio signals to the network-based computing platform. In addition, the device may provide the user's predefined utterance or characteristics associated with the user's speech to the platform. Thereafter, upon identifying voice commands within the audio signals, the network-based computing platform may determine whether a voice print of a user that provides a subsequent voice command has a sufficient similarity to a voice print of the user that uttered the predefined utterance. If so, the network-based computing platform may initiate performance of an action associated with the command. If not, then the network-based computing platform may disregard the voice command.

The devices and techniques described above and below may be implemented in a variety of different architectures and contexts. One non-limiting and illustrative implementation is described below. In addition, while certain components are illustrated as residing either locally within a user environment or remotely from the environment, it is to be appreciated that these components may be arranged in any other manner in other implementations.

FIG. 1 shows an illustrative voice interaction computing architecture 100 set in a home environment 102 that includes users 104(1) and 104(2). The architecture also includes an electronic voice-controlled device 106 with which the users 104 may interact. In the illustrated implementation, the voice-controlled device 106 is positioned on a table within a room of the home environment 102. In other implementations, it may be placed in any number of locations (e.g., ceiling, wall, in a lamp, beneath a table, under a chair, etc.). Further, more than one device 106 may be positioned in a single room, or one device may be used to accommodate user interactions from more than one MOM.

Generally, the voice-controlled device 106 has a microphone unit 108 that includes at least one microphone and a speaker unit 110 that includes at least one speaker to facilitate audio interactions with the users 104 and/or other users. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output. One example implementation of the voice-controlled device 106 is provided below in more detail with reference to FIG. 5.

The microphone unit 108 of the voice-controlled device 106 detects audio from the environment 102, such as sounds uttered from the users 104, and generates a corresponding audio signal. As illustrated, the voice-controlled device 106 includes a processor 112 and memory 114, which stores or otherwise has access to a speech-recognition engine 116. As used herein, a processor may include multiple processors and/or a processor having multiple cores. The speech-recognition engine 116 performs speech recognition on audio signals generated by the microphone unit, such as utterances spoken by the users 104. The voice-controlled device 106 may perform certain actions in response to recognizing different speech from the users 104. A user may speak predefined audible commands (e.g., "Wake up", "Sleep", etc.), or may use a more casual conversation style when interacting with the device 106 (e.g., "I'd like to go to a movie. Please tell me what's playing at the local cinema."). The device 106 may perform an array of actions in response to receiving voice commands from the users, with the actions including setting a reminder, playing a media file, adding an item to a list, providing a recommendation to the user, purchasing an item, placing a telephone call, or the like.

In some instances, the voice-controlled device 106 may operate in conjunction with or may otherwise utilize computing resources 118 that are remote from the environment 102. For instance, the voice-controlled device 106 may couple to the remote computing resources 118 over a network 120. As illustrated, the remote computing resources 118 may be implemented as one or more servers 122(1), 122(2), . . . , 122(P) and may, in some instances, form a portion of a network-accessible computing platform implemented as a computing infrastructure of processors, storage, software, data access, and so forth that is maintained and accessible via a network such as the Internet. The remote computing resources 118 do not require end-user knowledge of the physical location and configuration of the system that delivers the services. Common expressions associated for these remote computing devices 118 include "on-demand computing", "software as a service (SaaS)", "platform computing", "network-accessible platform", "cloud services", "data centers", and so forth.

The servers 122(1)-(P) include a processor 124 and memory 126, which may store or have access to a speech-recognition engine 128 for receiving audio signals from the device 106 and recognizing speech within the audio signals. In addition, the memory 126 may store or have access to an identification engine 130 that functions to identify users that provide voice commands and/or determine whether users that provide voice commands are the same or different users. The memory 126 may also store or have access to a command-processing engine 132 that may cause performance of actions in response to identifying voice commands from the audio signals.

In some instances, as described below, the voice-controlled device 106 may upload audio signals to the remote computing resources 118 for processing, given that the remote computing resources 118 may have a computational capacity that far exceeds the computational capacity of the voice-controlled device 106. Therefore, the voice-controlled device 106 may utilize the speech-recognition engine 128 at the remote computing resources 118 for performing relatively complex analysis on audio captured from the environment 102. In some instances, the device 106 transitions from an "asleep" state, in which the speech-recognition engine 116 performs ASR to identify a predefined utterance, to an "awake" state, in which the device 106 provides the audio signals to the remote computing resources 118 for performing ASR thereon. In some instances, the device 106 may transition from the "asleep" state to the "awake" state in response to a user selecting a button on the device itself or based on any other type of user input.

Regardless of whether the speech recognition occurs locally or remotely from the environment 102, the voice-controlled device 106 may receive vocal input from the users 104 and the device 106 and/or the resources 118 may perform speech recognition to interpret a user's operational request or command. The requests may be for essentially any type of operation, such as authentication, database inquires, requesting and consuming entertainment (e.g., gaming, finding and playing music, movies or other content, etc.), personal information management (e.g., calendaring, note taking, etc.), online shopping, financial transactions, and so forth.

The voice-controlled device 106 may communicatively couple to the network 120 via wired technologies (e.g., wires, USB, fiber optic cable, etc.), wireless technologies (e.g., RF, cellular, satellite, Bluetooth, etc.), or other connection technologies. The network 120 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

As described above, in some instances the device 106 and/or the remote computing resources 118 may engage in a dialog with a single user at a time, so as not to accept commands from other users when interacting with the single user. FIG. 1 illustrates, for instance, an example where the first user utters the following speech 134: "Wake up . . . Please add milk to my grocery list." In this example, the phrase "wake up" represents a predefined utterance that, when detected by the device 106, results in the device transitioning from an "asleep" state to an "awake" state.

As such, the local speech-recognition engine 116 may perform ASR on the speech 134 and, in response, may identify the predefined utterance "wake up". As a result, the device 106 may begin providing audio signals based on sound captured within the environment 102 to the remote computing resources 118. Thereafter, the remote computing resources 118 may begin analyzing the received audio signals to identify commands therein. In some instances, during the session in which the device is awake due to the user 104(1) uttering the predefined utterance, the remote computing resources 118 may perform actions associated with commands uttered by the user 104(1), while disregarding commands uttered by other users.

As illustrated, for instance, FIG. 1 illustrates that subsequent to the user 104(1) uttering the speech 134, the second user 104(2) may utter the following speech 136: "Add cereal to the grocery list too." However, because the device 106 has been engaging in a dialog with the first user 104(1), the remote computing resources 118 may refrain from causing performance of an action associated with the speech 136. That is, even though the speech-recognition engine 128 may identify the request to add cereal to the grocery list, the identification engine 130 may determine that the user (user 104(1)) that uttered the predefined utterance differs from the user (user 104(2)) making the current request. As such, the command-processing engine 132 may refrain from adding cereal to the grocery list of the user 104(1).

The command-processing engine 132 may perform other actions, in addition to or instead of disregarding the speech 136. For instance, the engine 132 may query the user 104(2) to identify the user 104(2) and/or to determine whether the user 104(2) truly desires to add milk to either the shopping list of the user 104(2) or the user 104(1). For instance, the engine 132 may output a query such as the following: "Did someone else wish to add cereal to the same shopping list or a different shopping list?" Additionally or alternatively, the engine 132 may request consent from the user 104(1) that is already engaging in a dialog with the device 106 before taking action on the speech 136 (e.g., "John, it has been suggested that you add cereal to your shopping list. Would you like me to add that as well?"). In yet another example, the command-processing engine 132 may request that the other user (e.g., user 104(2)) utter the predefined utterance (e.g., "wake up") before the engine 132 performs the action associated with the speech 136. In still another example, the command-processing engine 132 may request that the user 104(2) provide permission for the action requested by the user 104(1). For example, if a child requests to purchase an item, the engine 132 may request that the child's parent provide the appropriate authorization.

In addition to the illustrated scenario, the described engines and techniques may function to avoid processing non-command speech as voice commands directed at the device. For instance, if the environment 102 were to include several users talking to one another in addition to the user 104(1) directing voice commands at the device 106, the techniques may reduce the chances that conversational speech between the users—and not directed to the device 106 at all—is interpreted as a command upon which the remote computing resources 118 and/or the device 106 should take action upon. For instance, if one user remarks to another user that he should "call Bob right now", the techniques may avoid the scenario where the device 106 interprets this speech as a command to call someone named Bob from within the user's contacts list.

Returning to the illustrated example of FIG. 1, the identification engine 128 may determine that the user 104(1) that uttered the speech 134 differs from the user 104(2) that utters the speech 136 in any number of ways. For instance, the identification engine may compare a voice print (e.g., a Gaussian mixture model) associated with the speech 134 to a voice print (e.g., a Gaussian mixture model) associated with the speech 136. These voice prints may be based on users' pitch, frequency, a volume of the user speech, a location of the respective users that uttered the speech within the environment, grammar or choice of words within the different units of speech, or the like. In some instances, the device 106 may utilize beam-forming techniques, time-difference-of-arrival (TDOA) techniques, facial recognition techniques (e.g., using a video camera), or other techniques to determine a user's location within the environment.

In some instances, the process of performing user identification includes first recording a user's voice and extracting features from the utterance to form the initial voice print. Thereafter, a subsequent user utterance may be compared to the previously created voice print and, potentially, other previously created voice prints to identify a closest match. In some instances, a voice print may be compared to a previously created voice print(s) that occurred in a same session (i.e., one unit of speech may be compared to another unit of speech just uttered). Thereafter, the user may be determined to be a particular user that is associated with a voice print to which the utterance has a closest match to. Technologies used to process and store voice prints include frequency estimation, hidden Markov models, Gaussian mixture models, pattern matching algorithms, neural networks, cepstral mean subtraction (CMS), cepstral variance normalization (CVN), random forest classifiers, matrix representation, Vector Quantization, decision trees, cohort models, and world models. In some instances, a voice print may be derived by a joint-factor analysis (JFA) technique, an I-vector approach (based on a JFA), from a cMLLR, from a vocal tract length normalization warping factor, or the like.

In some instances, certain factors associated with a user's utterance are used to determine which speech features to focus on when attempting to identify a user based on an utterance of the user. These features may include a length of a user's utterance, a signal-to-noise (SNR) ratio of the utterance, a desired tradeoff between precision and robustness, and the like. For instance, a warping factor associated with the user utterance may be used more heavily to perform identification when a user's utterance is fairly short, whereas a cMLLR matrix may be utilized for longer utterances.

As discussed below, the identification engine 130 may determine a similarity between the two units of speech 134 and 136 and compare this similarity to a threshold in order to determine whether a same user uttered each unit of speech. This similarity may be measured in Euclidian distance in some instances. In other instances, the identification engine may utilize machine-learning techniques, such as a support vector machine (SVM), to classify two units of speech as either originating from a same user or not. That is, an SVM or other type of classifier may be trained based on an array of parameters, such that the units of speech 134 and 136 may be input into the SVM and the SVM may classify them as originating from the same user (e.g., user 104(1)) or not. In still other instances, the identification engine 130 may perform a linear transformation (e.g., a constrained maximum likelihood linear regression (cMLLR)) of both the speech 134 and the speech 136, and may compare these linear transformations to determine the likelihood that a common user uttered each piece of speech.

Figure 2:
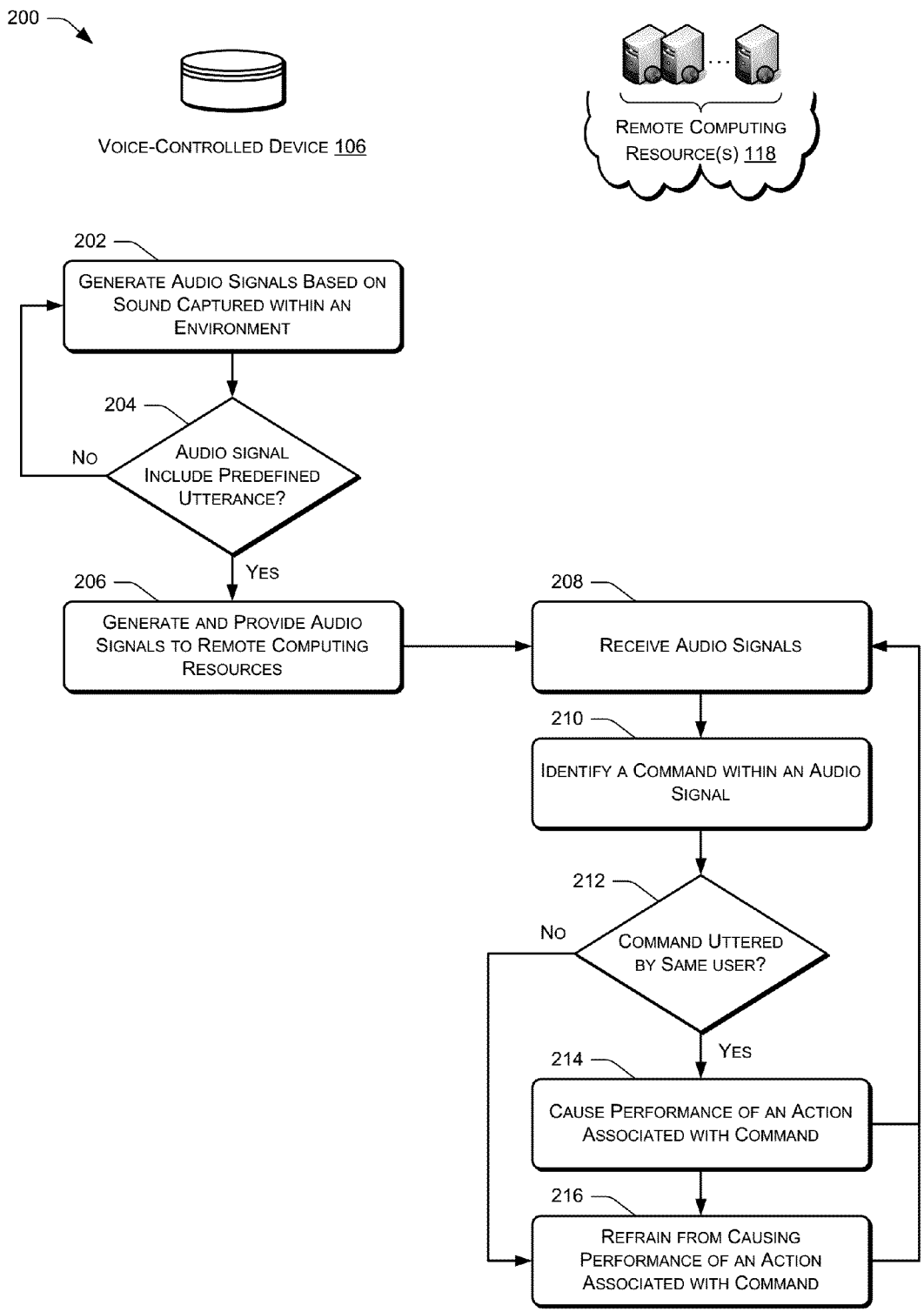
FIG. 2 illustrates an example process of the voice-controlled device of FIG. 1 being awoken in response to a voice command from a user. As illustrated, the device subsequently provides audio signals to the remote computing resources of FIG. 1, which perform ASR on the audio signals to identify voice commands therein. In response to identifying a voice command, the remote computing resources determine whether a user that provided the voice command is the same as a user that initially awoke the device.

FIG. 2 illustrates an example process 200 that the voice-controlled device 106 and the remote computing resources 118 of FIG. 1 may perform in accordance with the techniques described above. Again, while FIG. 2 illustrates a single implementation, it is to be appreciated that these acts may be performed by other entities and/or at other locations in different implementations.

The process 200 (and each process described herein) is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 202, the device 106 generates an audio signal based on sound captured within an environment, such as the environment 102. At 204, the device 106 performs ASR on the audio signal to determine whether the audio signal includes a predefined utterance, such as a user speaking one or more predefined words (e.g., "wake up"). If not, then the device continues to generate an audio signal(s) and analyze the signal(s) to determine whether they contain the predefined utterance.

If the audio signal does include the predefined utterance, meanwhile, then at 206 the device 106 continues to generate audio signals based on sound captured within the environment, but also provides these signals to the remote computing resources 118. At 208, the remote computing resources 118 receive the audio signals and, at 210, the remote computing resources 118 identify a command within the signals using ASR. At 212, the remote computing resources 118 then determine whether a user that uttered the predefined utterance is the same as a user that uttered the command identified at 210. If so, then at 214 the resources 118 cause performance of an action associated with the speech. For instance, the remote computing resources may begin playing a requested song, may add an item to a user's grocery list, or the like. If, however, it is determined that the users are not the same, then at 216 the remote computing resources may refrain from causing performance of the action associated with the command.

In some instances, if the remote computing resources 118 do not detect speech in the received audio signals for a certain amount of contiguous time, the resources 118 may instruct the device 106 to return to the first state where the device 106 does not provide audio signals to the resources 118. Thereafter, a user within the environment may need to again state the predefined utterance (as identified by the device 106) in order for the device 106 to provide audio signals to the resources 118 and, hence, to allow the user to provide voice commands.

Figure 3:
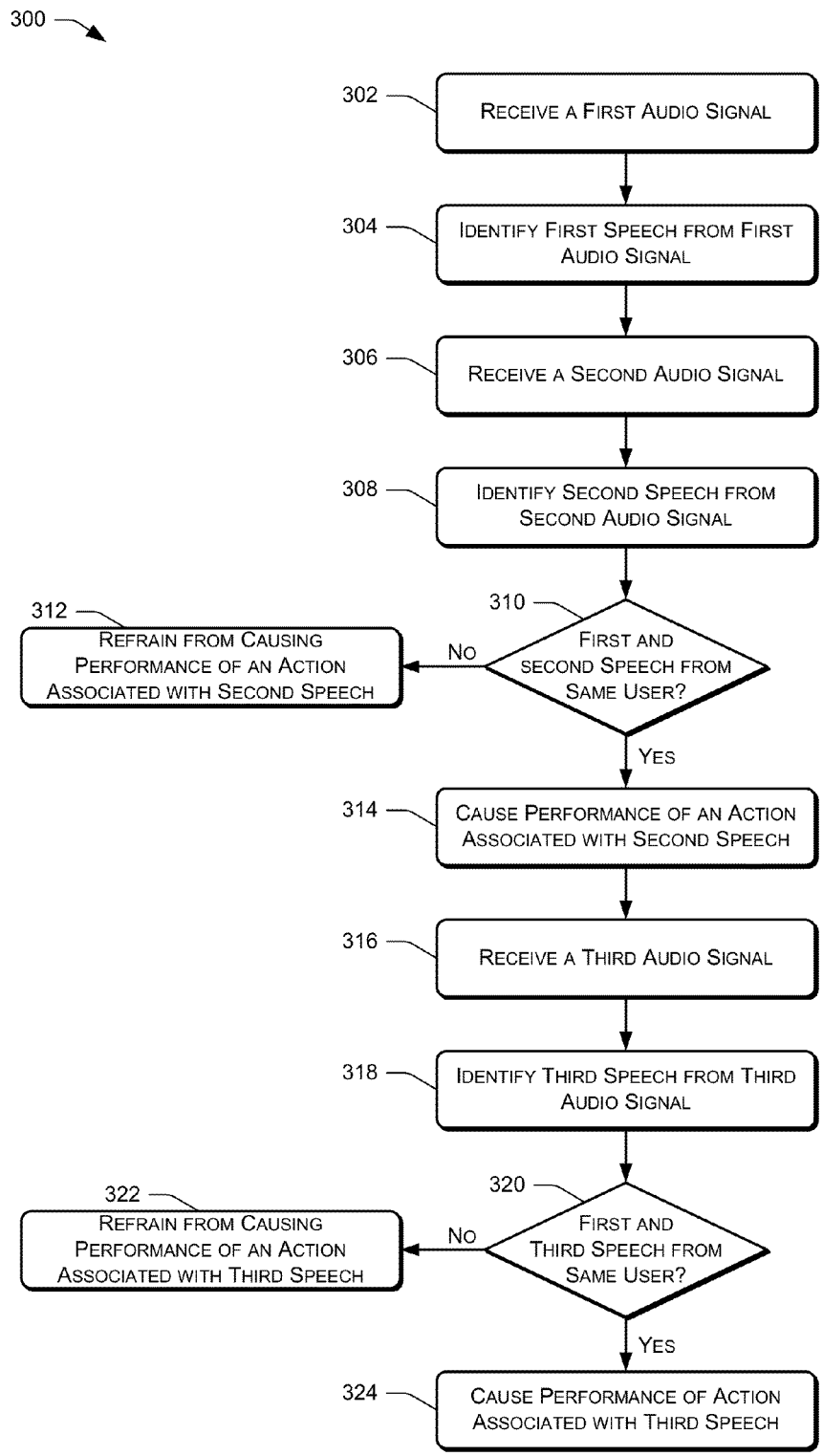
FIG. 3 illustrates a flow diagram of an example process for identifying a voice command from first user speech, performing an action associated with the first user speech, identifying a voice command from second user speech, and performing an action associated with the second user speech if the same user spoke both the first and second user speech.

FIG. 3 illustrates a flow diagram of another example process 300 that the architecture 100 or another architecture may implement. At 302, the process 300 receives a first audio signal and, at 304, identifies first speech within the first audio signal. At 306, the process 300 receives a second audio signal and, at 308, identifies second speech within the second audio signal.

After identifying the first and second speech, at 310 the process 300 determines whether the first and second speech originates from the same user. If not, then at 312 the process 300 may refrain from causing performance of an action associated with the second speech. If the users are determined to be the same, meanwhile, then at 314 the process 300 causes performance of the action associated with the second speech (e.g., adding an item to a list, providing a recommendation to a user, placing a phone call, etc.). In some instances, the process 300 may apply multiple thresholds with different corresponding actions. For instance, if it is determined with a very high likelihood that the first and second speech is from the same user, then the action may be performed at 314. Additionally, if the likelihood that the same user provided the first and second speech is very low, then the process 300 may refrain from causing performance of the action, and might not issue further queries or otherwise interact with the user. If, however, the process 300 determines that the likelihood is neither very low or very high, the process 300 may issue one or more clarifying questions, the answers to which may be used to determine whether to perform the action or not. In these instances, both the content and the voice prints associated with the answers may be used to make this determination.

At 316, the process 300 receives a third audio signal and, at 318, identifies third speech from within the third audio signal. At 320, the process 300 then determines whether the first and third speech originates from the same user. If not, then at 322 the process 300 may refrain from causing performance of an action associated with the third speech. If the users are determined to be the same, meanwhile, then at 324 the process 300 causes performance of the action associated with the third speech (e.g., adding an item to a list, providing a recommendation to a user, placing a phone call, etc.).

Figure 4:
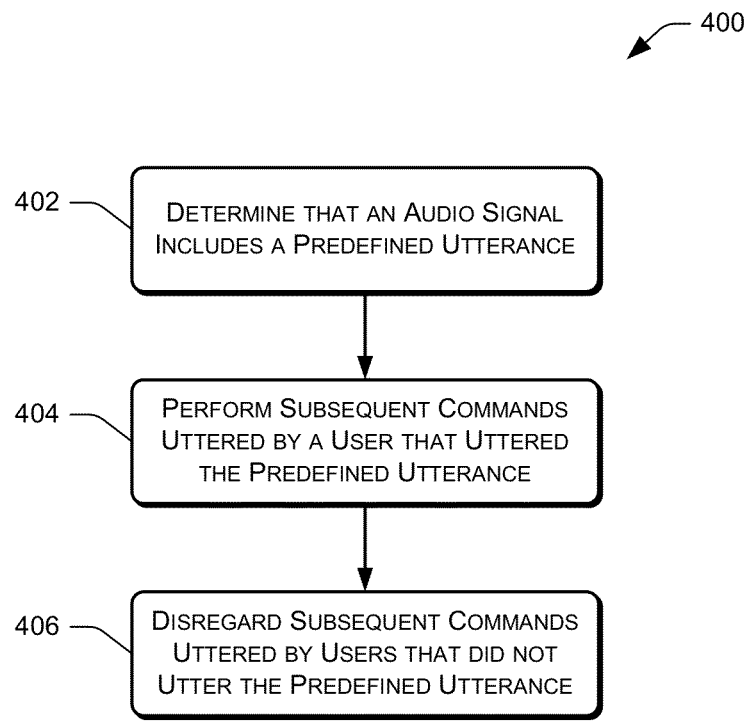
FIG. 4 illustrates a flow diagram of an example process for determining that an audio signal includes a predefined utterance, performing subsequent voice commands uttered by a user that spoke the predefined utterance, and disregarding voice commands uttered by other users.

FIG. 4 illustrates a flow diagram of yet another example process 400 At 402, the process 400 determines that an audio signal includes a predefined utterance, such as one or more predefined words spoken by a user. At 404, the process 400 then proceeds to perform subsequent commands uttered by the user that spoke the predefined utterance. For instance, in one example the process 400 performs actions requested by the user that initially awoke a device, such as the voice-controlled device 106. At 406, meanwhile, the process 400 disregards commands uttered by users other than the user that spoke the predefined utterance. By doing so, the process 400 helps to ensure that only the user that is engaging in a dialog with the device is able to control the device, at least for a certain amount of time after the user speaks the predefined utterance.

Figure 5:
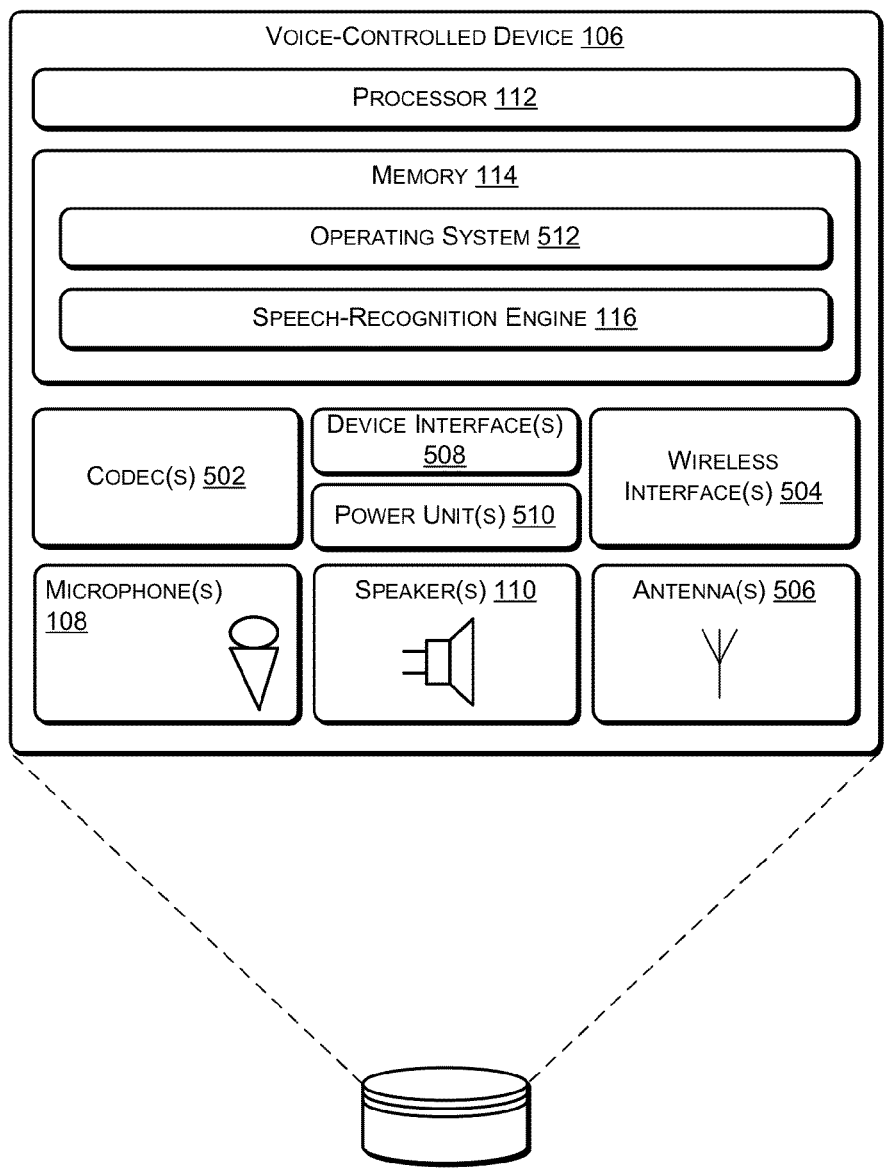
FIG. 5 shows a block diagram of selected functional components implemented in the voice-controlled device of FIG. 1.

FIG. 5 shows a block diagram of selected functional components implemented in the voice-controlled device 106 of FIG. 1. While this figure illustrates one example device, it is to be appreciated that any other type of client or server computing device may implement the techniques described herein. Furthermore, it is to be appreciated that the device 106 may include some or all of the components described above with reference to the remote computing resources 118.

Generally, the voice-controlled device 106 may be implemented as a standalone device that is relatively simple in terms of functional capabilities with limited input/output components, memory and processing capabilities. For instance, the voice-controlled device 106 does not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the voice-controlled device 106 includes the processor 112 and memory 114. The memory 114 may include computer-readable storage media ("CRSM"), which may be any available physical media accessible by the processor 112 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 112.

The voice-controlled device 106 includes the microphone unit 108 that comprises one or more microphones to receive audio input, such as user voice input. The device 106 also includes the speaker unit 110 that includes one or more speakers to output audio sounds. One or more codecs 502 are coupled to the microphone unit 108 and the speaker unit 110 to encode and/or decode the audio signals. The codec may convert audio data between analog and digital formats. A user may interact with the device 106 by speaking to it and the microphone unit 108 captures sound and generates an audio signal that includes the user speech. The codec 502 encodes the user speech and transfers that audio data to other components. The device 106 can communicate back to the user by emitting audible statements or tones through the speaker unit 110. In this manner, the user interacts with the voice-controlled device simply through speech, without use of a keyboard or display common to other types of devices. Of course, the device 106 may additionally or alternatively interact with the user visually (e.g., using LED lights) or in any other way.

In the illustrated example, the voice-controlled device 106 includes one or more wireless interfaces 504 coupled to one or more antennas 506 to facilitate a wireless connection to a network. The wireless interface 504 may implement one or more of various wireless technologies, such as wifi, Bluetooth, RF, and so on.

One or more device interfaces 508 (e.g., USB, broadband connection, etc.) may further be provided as part of the device 106 to facilitate a wired connection to a network, or a plug-in network device that communicates with other wireless networks. One or more power units 510 are further provided to distribute power to the various components on the device 106.

The voice-controlled device 106 is designed to support audio interactions with the user, in the form of receiving voice commands (e.g., words, phrase, sentences, etc.) from the user and outputting audible feedback to the user. Accordingly, in the illustrated implementation, there are no or few haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons. There may also be one or more simple light elements (e.g., LEDs around perimeter of a top portion of the device) to indicate a state such as, for example, when power is on or to effectively indicate when the device believes that the user may be attempting to cause the device to transition between device states. But, otherwise, the device 106 does not use or need to use any input devices or displays in some instances.

Several modules such as instruction, datastores, and so forth may be stored within the memory 114 and configured to execute on the processor 112. An operating system module 512 is configured to manage hardware and services (e.g., wireless unit, Codec, etc.) within and coupled to the device 106 for the benefit of other modules. In addition, the memory 114 may include the speech-recognition engine 116, described above, amongst other modules. Some or all of these modules, data stores, and components may reside additionally or alternatively at the remote computing resources 118.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. One or more computing devices comprising:
   one or more processors;
   one or more computer-readable media storing computer-executable instructions that, when executed by the one or more processors, cause the one or more processors to perform acts comprising:
   receiving a first audio signal generated based on a first sound captured within an environment;
   identifying first speech from the first audio signal, the first speech including a wake word;
   receiving a second audio signal generated based on a second sound captured within the environment;
   determining that the second audio signal includes second speech;
   determining whether a user that spoke the first speech is the same as a user that spoke the second speech;
   causing performance of an action associated with the second speech at least partly in response to determining that the user that spoke the first speech is the same as the user that spoke the second speech; and
   refraining from causing performance of the action associated with the second speech at least partly in response to determining that the user that spoke the first speech is not the same as the user that spoke the second speech.

2. One or more computing devices as recited in claim 1, the acts further comprising:
   receiving a third audio signal generated based on a third sound captured within the environment;
   determining that the third audio signal includes third speech;
   determining whether the user that spoke the first speech is the same as a user that spoke the third speech;
   causing performance of an action associated with the third speech at least partly in response to determining that the user that spoke the first speech is the same as the user that spoke the third speech; and
   refraining from causing performance of the action associated with the third speech at least partly in response to determining that the user that spoke the first speech is not the same as the user that spoke the third speech.

3. One or more computing devices as recited in claim 1, the acts further comprising:
   issuing a query to the user that spoke the second speech at least partly in response to determining that the user that spoke the first speech is not the same as the user that spoke the second speech.

4. One or more computing devices as recited in claim 3, wherein the query requests that the user that spoke the second speech confirm that the user that spoke the second speech would like to request performance of the action associated with the second speech.

5. One or more computing devices as recited in claim 1, wherein the determining is based at least in part on at least one of a Gaussian mixture model of the first speech compared to a Gaussian mixture model of the second speech, a cMLLR matrix created from the first speech compared to a cMLLR matrix created from the second speech, or a location within the environment of the user that spoke the first speech compared to a location within the environment of the user that spoke the second speech.

6. One or more non-transitory computer-readable media storing computer-executable instructions that, when executed by one or more processors, cause the one or more processors to perform acts comprising:
   determining whether a user that uttered a first audible command is the same as a user that uttered a second audible command;
   causing performance of an action associated with the second audible command at least partly in response to determining that the user that uttered the first audible command is the same as the user that uttered the second audible command; and
   refraining from causing performance of the action associated with the second audible command at least partly in response to determining that the user that uttered the first audible command is not the same as the user that uttered the second audible command.

7. One or more non-transitory computer-readable media as recited in claim 6, wherein the first audible command comprises a command to awaken a device proximate to the user that provided the first audible command, the device configured to provide audio signals generated based on one or more sounds captured within an environment to one or more remote computing devices upon recognizing the command to awaken the device.

8. One or more non-transitory computer-readable media as recited in claim 7, wherein the command to awaken the device comprises one or more predefined words.

9. One or more non-transitory computer-readable media as recited in claim 6, the acts further comprising:
   determining whether a user that uttered a third audible command is the same as the user that uttered the first audible command;
   causing performance of an action associated with the third audible command at least partly in response to determining that the user that uttered the third audible command is the same as the user that uttered the first audible command; and
   refraining from causing performance of the action associated with the third audible command at least partly in response to determining that the user that uttered the third audible command is not the same as the user that uttered the first audible command.

10. One or more non-transitory computer-readable media as recited in claim 6, wherein the determining is based at least in part on at least one of a Gaussian mixture model, a cMLLR matrix, or directionality relative to a device that captures one or more sounds associated with the first and second audible commands.

11. One or more non-transitory computer-readable media as recited in claim 6, wherein the determining comprises:
   calculating a similarity between a voice print associated with the first audible command and a voice print associated with the second audible command;
   comparing the similarity to a threshold; and
   determining that the user that uttered the first audible command is the same as the user that uttered the second audible command at least partly in response to determining that the similarity is greater than the threshold.

12. One or more non-transitory computer-readable media as recited in claim 6, wherein the determining is performed at least partly using a support vector machine (SVM) configured to classify different units of speech as originating from a same user or from different users.

13. One or more non-transitory computer-readable media as recited in claim 6, wherein the action associated with the second audible command comprises setting a reminder, playing a media file, adding an item to a list, providing a recommendation to the user, purchasing an item, or placing a telephone call.

14. One or more non-transitory computer-readable media as recited in claim 6, wherein at least a portion of the one or more computer-readable media resides within a device that captures one or more sounds associated with the first and second audible commands.

15. One or more non-transitory computer-readable media as recited in claim 6, wherein at least a portion of the one or more computer-readable media resides remote from a device that captures one or more sounds associated with the first and second audible commands, the device providing audio signals over a network and to the at least a portion of the one or more computer-readable media.

16. A method comprising:
   under control of one or more computing devices configured with executable instructions,
   determining that an audio signal includes a predefined utterance;
   performing a first subsequent command at least partially in response to the first subsequent command being uttered by a user that uttered the predefined utterance; and
   disregarding a second subsequent command at least partially in response to the second subsequent command being uttered by a different user from the user that uttered the predefined utterance.

17. A method as recited in claim 16, further comprising determining, for the first subsequent command, whether the user that uttered the first subsequent command is the same as the user that uttered the predefined utterance.

18. A method as recited in claim 16, further comprising:
   calculating, for the first subsequent command, a similarity between a voice print associated with the first subsequent command and a voice print associated with the predefined utterance; and
   comparing the similarity to a threshold.

19. A method as recited in claim 16, wherein the disregarding comprises refraining from performing the second subsequent command for the different user, and further comprising requesting that the different user utter the predefined utterance or another predefined utterance.

20. A method as recited in claim 19, further comprising performing the second subsequent command uttered by the different user at least partly in response to the different user uttering the predefined utterance or the other predefined utterance.

* * * * *